United States Patent Office 3,836,610
Patented Sept. 17, 1974

3,836,610
PROCESS FOR MAKING AN O,O-DI($C_1$-$C_8$ ALKYL) THIOPHOSPHORYL CHLORIDE
William R. Diveley, New Castle, Del., assignor to Hercules Incorporated, Wilmington, Del.
No Drawing. Continuation-in-part of abandoned application Ser. No. 7,262, Jan. 30, 1970. This application June 12, 1973, Ser. No. 369,351
Int. Cl. C07f 9/14
U.S. Cl. 260—986          12 Claims

ABSTRACT OF THE DISCLOSURE

Disclosed is a process for making from an O,O-di($C_1$-$C_8$ alkyl) dithiophosphoric acid and chlorine a reaction product comprising the corresponding di($C_1$-$C_8$ alkyl) thiophosphoryl chloride, which product is substantially free of sulfur monochloride, O-($C_1$-$C_8$ alkyl) phosphoryl dichloride and bis[O,O-di($C_1$-$C_8$ alkyl) thiophosphoryl] disulfide. In this process the acid, preferably dissolved in inert anhydrous solvent, is reacted in a temperature range from about —10 to about 10° C. with about one molar equivalent of chlorine, whereby a reaction mixture containing sulfur monochloride is formed. The reaction mixture is established and maintained in a temperature range from about 85 to about 110° C. until it is substantially free of sulfur monochloride, and in preferred embodiments until the relatively thermally unstable sulfur that forms becomes more thermally stable. The resulting reaction mixture consists essentially of O,O-di($C_1$-$C_8$ alkyl) thiophosphoryl chloride and sulfur. In preferred embodiments, the desired chloride can be distilled from the reaction mixture with the risk of an uncontrollable exothermic decomposition reaction being at a minimum.

---

The application is a continuation-in-part of the U.S. patent application, Ser. No. 7,262, filed Jan. 30, 1970 and now abandoned.

This invention is in the chemical arts. It has to do with that branch of organic chemistry pertaining to thiophosphoric acid esters.

More particularly, this invention relates to the production of O,O-di($C_1$-$C_8$ alkyl) thiophosphoryl chloride represented by the structural formula (I):

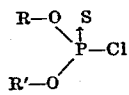

from the corresponding O,O-di($C_1$-$C_8$ alkyl) dithiophosphoric acid of the structural formula (II):

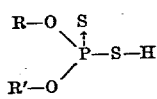

In both of the structural formulas R and R' are $C_1$-$C_8$ alkyl radicals.

O,O-di($C_1$-$C_8$ alkyl) thiophosphoryl chlorides are useful as intermediates in the synthesis of insecticidal compounds and compounds having utility as property improvers for lubricants. For instance, O,O-diethyl thiophosphoryl chloride is an intermediate in the synthesis of the insecticide known as parathion, and O,O-dimethyl thiophosphoryl chloride is an intermediate in the synthesis of the insecticide called methyl parathion.

In one reported process for making O,O-di($C_1$-$C_8$ alkyl) thiophosphoryl chloride two molar equivalents of the corresponding O,O-di($C_1$-$C_8$ alkyl) dithiophosphoric acid are reacted with three molar equivalents of chlorine, the reaction being represented by the equation:

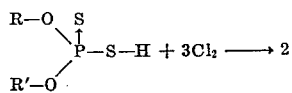

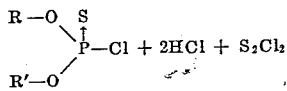

Not only is the desired chloride formed in the reaction, but hydrogen chloride and sulfur monochloride are formed also. Because of the water-free condition of the reaction mixture, the hydrogen chloride formed in the reaction mostly evolves as a gas from the reaction mixture. Consequently, on completion of the reaction the reaction mixture comprises the desired chloride and sulfur monochloride.

A disadvantage of this reported process is the presence of sulfur monochloride in the final reaction mixture. Generally, it must be separated from the dialkyl thiophosphoryl chloride. This is difficult to do without the sulfur monochloride decomposing a significant portion of the dialkyl thiophosphoryl chloride.

Another disadvantage of this process is the amount of chlorine that is used. For each mole of acid there are reacted in theory one and a half moles of chlorine.

Still another disadvantage of this process is the formation of significant quantities of undesirable by-products as a result of the amount of chlorine that is used.

Another reaction by which di($C_1$-$C_8$ alkyl) thiophosphoryl chloride is made has been reported. In this reaction one molar equivalent of di($C_1$-$C_8$ alkyl) dithiophosphoric acid is reacted with one molar equivalent of chlorine. The reaction is represented by the equation:

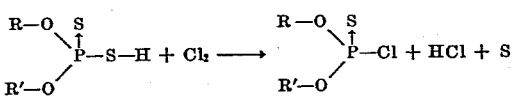

In one reference, the U.S. Patent, 3,502,750, to Anglaret et al., the reaction conditions were not reported. However, when I carried out the reaction at about 90° C. with dimethyl dithiophosphoric acid, I obtained a reaction product which comprised not only the desired dimethyl thiophosphoryl chloride, but also a substantial amount of the corresponding monomethyl phosphoryl dichloride. In another reference, Gazzetta Chemica Italiana 81, 596–608 (1951), particularly pages 599 and 606, the reaction conditions are reported. The chlorine is introduced into a carbon tetrachloride solution of the acid at —10° C. When all of the chlorine has been added, the resulting reaction mixture is slowly heated to 70° C. and maintained at this temperature for 4–5 hours. However, when I tried to duplicate the results of the reference, after removal of the carbon tetrachloride from the final reaction mixture, no sulfur precipitated, and after distillation of the desired O,O-diethyl thiophosphoryl chloride from the solvent-free reaction mixture the residue contained more than just sulfur. A differential thermal analysis of the residue gave results which indicate the residue contained a significant concentration of bis(O,O-diethyl thiophosphoryl)-disulfide.

This invention provides a process which minimizes or avoids to a large extent these disadvantages.

In summary, this invention provides a process for making an O,O-di($C_1$-$C_8$ alkyl) thiophosphoryl chloride, which comprises: (1) admixing in a temperature range from about —10 to about 10° C. (a) about one molar equivalent of chlorine ($Cl_2$) with (b) one molar equivalent of the corresponding O,O-dialkyl dithiophosphoric acid, whereby a reaction mixture comprising sulfur monochloride is formed; (2) when substantially all of the chlorine has reacted, establishing and maintaining the reaction mixture in a temperature range from about 85 to about 110° C. until it is substantially free of sulfur monochloride and, in preferred embodiments, until the thermally unstable sulfur that forms becomes more thermally stable. The reaction mixture thus obtained, substantially free of sulfur monochloride and the corresponding mono-($C_1$–$C_8$ alkyl) (phosphoryl dichloride, consists essentially of the O,O-di($C_1$–$C_8$ alkyl) thiophosphoryl chloride and sulfur which in those preferred embodiments is relatively thermally stable or in a low energy condition. Consequently, in those preferred embodiments the dialkyl thiophosphoryl chloride can be readily and safely removed therefrom by distillation. Alternatively, the dialkyl thiophosphoryl chloride can be separated from the reaction mixture by extraction. Still other ways of separating the chloride from the reaction mixture are within the scope of this invention.

The overall reactions believed to take place in the two steps of the process of this invention are depicted by the following equations:

Step 1 (Temperature range from about —10 to about 10° C.)

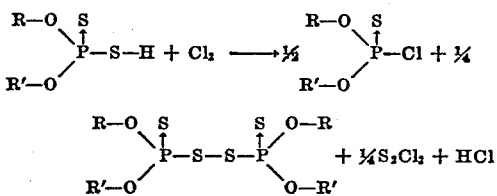

Step 2 (Temperature range from about 85 to about 110° C.)

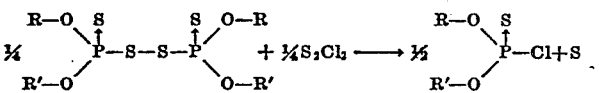

As before indicated, R and R' in structural formula II are $C_1$–$C_8$ alkyl radicals. Each alkyl radical can be either straight chain or branched chain. Also, the alkyl radicals can be the same or different. Examples of alkyl radicals include methyl, ethyl, propyl, isopropyl, n-butyl, sec. butyl, t-butyl, and the like.

In the process of this invention the reaction of the acid with chlorine can be carried out under substantially anhydrous conditions in the absence of a liquid reaction medium. In preferred embodiments of the process, however, it is carried out in an anhydrous inert reaction medium which is liquid in the temperature ranges involved in the two steps of the process of this invention, and which preferably dissolves the acid in the temperature range involved in the first step of the process of this invention. In some embodiments of this invention the inert liquid reaction medium consists essentially of a liquid substance which is inert or substantially inert under the conditions of the process. In other embodiments it comprises a mixture of two or more such substances. Examples of an inert liquid substance include benzene, toluene, carbon tetrachloride, chloroform, and the like, with toluene being preferred.

When a liquid reaction medium is used, the quantity of the liquid reaction medium employed generally is in a range from about 5 to about 95% by weight of the acid, and preferably in a range from about 30 to about 65% by weight of the acid.

The quantity of chlorine admixed with the acid in the process of this invention is about one molar equivalent. Preferably it is slightly more than 1 molar equivalent, for instance, about 1.05 molar equivalents. Use of slightly more than 1 molar equivalent is advantageous in the process of this invention when the acid is accompanied by minor concentrations of such compounds as the corresponding O,O-di($C_1$–$C_8$ alkyl) thiophosphite and O,O-S-tri($C_1$–$C_8$ alkyl) phosphorodithioate, and the like, which react with chlorine to form the corresponding di($C_1$–$C_8$ alkyl) thiophosphoryl chloride. A quantity of chlorine substantially greater than about one molar equivalent should be avoided, however, because it results in substantially increased concentrations of by-products in the end product, and lower conversions of the O,O-di($C_1$–$C_8$ alkyl) thiophosphoryl chloride in subsequent reactions in which the compound is employed as a reactant.

The temperature ranges in which the two steps of the process of this invention are carried out are important. The low temperature range of the first step minimizes the non-selective attack of chlorine on the O,O-di($C_1$–$C_8$ alkyl) thiophosphoryl chloride. because the concentration of the chloride in the first step reaction mixture is low, and maximizes the reaction of chlorine with the acid and disulfide intermediate, both of which are present at concentrations relatively higher than the concentration of the chloride. The second step of the process of this invention is not performed until substantially all of the chlorine has reacted. In the higher temperature range of the second step sulfur monochloride, being more selective in its reaction than chlorine, reacts preferentially with the disulfide to produce the O,O-di($C_1$–$C_8$ alkyl) thiophosphoryl chloride rather than attack the latter. In the higher temperature range the relatively thermally unstable sulfur that is formed ultimately will convert to a relatively more thermally stable form.

The reactions that take place in the first step of the process are exothermic. Consequently, it is recommended that in the first step of the process the chlorine be admixed with the acid at a rate at which the temperature of the resulting reaction mixture can be maintained in the temperature range specified for the first step.

While the temperature range for the first step has been broadly indicated as generally from about —10 to about 10° C., the preferred range is from about —3 to about 3° C. Also, while the temperature range for the second step of the process is specified as generally from about 85 to about 110° C., a preferred range is from about 90 to about 100° C.

The second step of the process of this invention is carried out at least to the extent the sulfur monochloride concentration of the reaction mixture is no longer substantial and preferably no longer detectable as by the potassium iodide test. In preferred embodiments the second step is carried out not only to the foregoing extent, but also to the extent that substantially all of the thermally unstable sulfur that forms becomes substantially more thermally stable as ascertained, for example, by differential thermal analysis. In preferred embodiments the second step is carried out for a period of time generally in the range from about a half-hour to about two hours and preferably in the range from about 45 minutes to about one hour. However, operable greater and lesser periods of time are within the broader concepts of this invention.

The steps of the process of this invention generally are carried out at atmospheric pressure. However, operable pressures higher than atmospheric and lower than atmospheric are within the broader concepts of this invention.

Upon completion of the second step of the process of this invention the desired end product consisting essentially of the O,O-di($C_1$–$C_8$ alkyl) thiophosphoryl chloride is separated from the reaction mixture. In preferred embodiments in which the sulfur in the reaction mixture is converted to a relatively thermally stable state the separation preferably is by distillation. On the other hand, the desired end product in all embodiments can be separated by other methods such as, for example, extraction, crystallization and filtration, and the like.

The process of this invention is illustrated further by the following working example of a preferred specific embodiment of the process. This invention is not limited to this embodiment. In the example all percentages are by weight unless otherwise specifically indicated, all parts by weight are designated by "w.," and all parts by volume are designated by "v." with the parts by weight (w.) being related to the parts by volume (v.) as the kilogram is to the liter.

Example

This example illustrates a preferred specific embodiment of the process of this invention for making dimethyl thiophosphoryl chloride.

To a reactor established and maintained under anhydrous conditions and equipped with cooling means, a stirrer, thermometer, condenser and a gas delivery tube, the outlet of which is adjacent the bottom of the reactor, is charged a solution (161.3 w.; 150 v.) consisting essentially of dimethyl dithiophosphoric acid material (93.8 w.) in toluene. The dimethyl dithiophosphoric acid material consists essentially of O,O-dimethyl dithiophosphoric acid at a concentration of about 58.1% of the material. The residue of the material is composed of by-products formed in the prepartion of the acid. The solution is stirred and cooled to about 0° C. After purging the gas delivery system and the interior of the reactor with an inert gas such as nitrogen or the like, the flow (about 230 v. per minute) of chlorine gas through the gas delivery tube into the solution is started and continued for about 60 minutes until 44.3 w. of chlorine has been added to the solution. During this time the temperature of the reactor contents is maintained at about 0° C. The flow of chlorine gas is stopped, and the reaction mixture is maintained for about 5 minutes at about 0° C. The reaction mixture then is sparged slowly with an inert gas such as nitrogen or the like while its temperature is increased over a period of about 57 minutes to about 90° C. Sparging of the reaction mixture with the inert gas is stopped and the reaction mixture is maintained at 90–95° C. for about 30 minutes. At the end of this period of time the reaction mixture generally is substantially free of sulfur monochloride as can be verified by the potassium iodide test. The resulting reaction mixture (176.5 w.) is then cooled to 20–25° C.

The reaction mixture (176.1 w. after removal of a 0.45 w. sample which typically has a precipitated sulfur content and substantially no bis(dimethylthiophosphoryl) disulfide content) is distilled by heating it slowly to a temperature of 90° C. at a pressure of 15–18 millimeters of mercury and collecting the complete distillate. This distillate is removed. Then the pressure is reduced to less than 1 millimeter of mercury and the temperature of the residue maintained at about 90° C. to remove therefrom the last traces of the desired end product. When no more distillate comes over, the temperature of the residue is permitted to fall to 20–25° C., and the pressure is permitted to rise to atmospheric pressure. The residue (33.1 w.) on cooling to 20–25° C. typically is a yellow solid-dark liquid mixture. The distillates are combined to give a toluene solution (130.2 w.) consisting essentially of O,O-dimethyl thiophosphoryl chloride and toluene.

A gas chromatographic analysis of a solution heretofore made according to this Example is:

| Compound | Percent |
|---|---|
| O,O-dimethyl thiophosphoryl chloride | 54.8 |
| O,O-dimethyl phosphoryl chloride | 0.1 |
| O-methyl phosphoryl dichloride | <0.1 |
| Sulfur monochloride | None detected |
| Toluene | 40.3 |

By following the general procedure of this Example, O,O-diethyl thiophosphoryl chloride is obtained from O,O-diethyl dithiophosphoric acid.

By following the general procedure of this Example, products consisting essentially of other specific O,O-di($C_1$–$C_8$ alkyl) thiophosphoryl chlorides are made from the corresponding O,O-di($C_1$–$C_8$ alkyl) dithiophosphoric acids.

One feature of advantage of the process of this invention is that undesired by-product formation, especially mono($C_1$–$C_8$ alkyl) phosphoryl chloride, is kept at a minimum.

Still another feature of advantage of the process of this invention is that the ultimate reaction product has substantially no sulfur monochloride.

Still another feature of advantage of the process of this invention is that there is less sulfur formed.

Yet another feature of advantage of the process of this invention is the reduced chlorine requirement.

Other features, advantages and specific embodiments of this invention will become readily apparent to those exercising ordinary skill in the art after reading the foregoing disclosures. Such specific embodiments are within the scope of this invention. Moreover, while a specific embodiment has been described in considerable detail, variations and modifications of this embodiment can be effected without departing from the spirit and scope of the invention as disclosed and claimed.

The term "consisting essentially of" as used in this specification excludes any unrecited substance at a concentration sufficient to substantially adversely affect the essential properties and characteristics of the composition of matter being defined, while permitting the presence of one or more unrecited substances at concentrations insufficient to substantially adversely affect said essential properties and characteristics.

I claim:

1. A process for making a di($C_1$–$C_8$ alkyl) thiophosphoryl chloride having the structural formula:

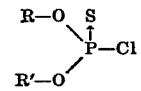

in which R and R' are $C_1$–$C_8$ alkyl, which comprises:
   (1) admixing in a first temperature range from about −10 to about 10° C. (a) about one molar equivalent of the corresponding di($C_1$–$C_8$ alkyl) dithiophosphoric acid having the structural formula:

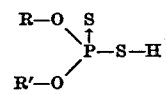

with (b) about one molar equivalent of chlorine, whereby a first reaction mixture containing sulfur monochloride is formed; and
   (2) when substantially all of the chlorine has reacted, establishing and maintaining said first reaction mixture in a second temperature range from about 85 to about 110° C. until it is substantially free of sulfur monochloride, whereby a second reaction mixture containing the di($C_1$–$C_8$ alkyl) thiophosphoryl chloride, and sulfur, and substantially free of the corresponding bis[di($C_1$–$C_8$ alkyl) thiophosphoryl] disulfide, is obtained.

2. A process according to claim 1, wherein (1) and (2) are carried out in an inert anhydrous liquid reaction medium.

3. A process according to claim 2, wherein said acid is soluble in said liquid reaction medium.

4. A process according to claim 3, wherein the concentration of said anhydrous inert liquid reaction medium is in a range from about 5 to about 95% by weight of said acid.

5. A process according to claim 4, wherein said concentration is in a range from about 30 to about 65% by weight of said acid.

6. A process according to claim 5, wherein said medium consists essentially of toluene.

7. A process according to claim 5, wherein said first temperature range is from about −3 to about 3° C.

8. A process according to claim 7, wherein said second temperature range is from 90 to about 100° C.

9. A process according to claim 8, wherein said second reaction mixture is maintained in said second temperature range until substantially all of the relatively thermally unstable sulfur formed therein has become substantially more thermally stable.

10. A process according to claim 9, wherein a di($C_1$–$C_8$ alkyl) thiophosphoryl chloride product substantially free of sulfur and consisting essentially of the di($C_1$–$C_8$ alkyl) thiophosphoryl chloride is separated from said second reaction mixture by distillation at 90–100° C. and reduced pressure.

11. A process according to claim 1, wherein R and R' are methyl.

12. A process according to claim 1, wherein R and R' are ethyl.

References Cited

UNITED STATES PATENTS

| | | | |
|---|---|---|---|
| 2,482,063 | 9/1949 | Hechenbleikner | 260—986 |
| 3,502,750 | 3/1970 | Anglaret et al. | 260—986 |
| 2,692,893 | 10/1954 | Hechenbleikner | 260—986 |
| 3,089,890 | 5/1963 | Chupp et al. | 260—990 |

FOREIGN PATENTS

| | | | |
|---|---|---|---|
| 656,303 | 8/1951 | Great Britain | 260—986 |

OTHER REFERENCES

Gazzetta Chemica Italiana, 81 p. 596–608 (1951).

LORRAINE A. WEINBERGER, Primary Examiner

R. L. RAYMOND, Assistant Examiner